(12) United States Patent
Karaoguz et al.

(10) Patent No.: US 7,734,788 B2
(45) Date of Patent: Jun. 8, 2010

(54) PERSONAL ACCESS AND CONTROL OF MEDIA PERIPHERALS ON A MEDIA EXCHANGE NETWORK

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/391,022

(22) Filed: Feb. 23, 2009

(65) Prior Publication Data

US 2009/0157808 A1 Jun. 18, 2009

Related U.S. Application Data

(63) Continuation of application No. 10/660,267, filed on Sep. 11, 2003, now Pat. No. 7,496,665.

(60) Provisional application No. 60/432,472, filed on Dec. 11, 2002, provisional application No. 60/443,894, filed on Jan. 30, 2003.

(51) Int. Cl.
*G06F 15/173* (2006.01)

(52) U.S. Cl. ............... 709/226; 709/212; 709/217; 709/219; 709/223; 709/230; 725/86; 725/91; 725/100; 725/103; 348/207.1

(58) Field of Classification Search ............ 709/212, 709/217, 219, 223, 226, 230; 725/86, 91, 725/100, 103; 348/207.1
See application file for complete search history.

(56) References Cited

U.S. PATENT DOCUMENTS

| | | | |
|---|---|---|---|
| 5,721,815 A * | 2/1998 | Ottesen et al. | 715/721 |
| 5,917,997 A * | 6/1999 | Bell et al. | 714/4 |
| 6,233,428 B1 | 5/2001 | Fryer | |
| 6,349,324 B1 * | 2/2002 | Tokoro | 709/200 |
| 6,480,889 B1 * | 11/2002 | Saito et al. | 709/220 |
| 6,631,247 B1 * | 10/2003 | Motoyama et al. | 399/8 |
| 6,643,658 B1 * | 11/2003 | Jai et al. | 707/100 |
| 6,693,896 B1 * | 2/2004 | Utsumi et al. | 370/352 |
| 6,963,358 B2 * | 11/2005 | Cohen et al. | 348/207.1 |
| 7,003,795 B2 | 2/2006 | Allen | |
| 7,055,104 B1 * | 5/2006 | Billmaier et al. | 715/765 |
| 7,065,778 B1 * | 6/2006 | Lu | 725/98 |
| 7,075,573 B2 * | 7/2006 | Imaeda | 348/231.99 |

(Continued)

OTHER PUBLICATIONS

European Search Report for Application No. 04001226.2 mailed Sep. 3, 2007.

(Continued)

*Primary Examiner*—Liangche A Wang
(74) *Attorney, Agent, or Firm*—McAndrews, Held & Malloy

(57) ABSTRACT

Methods are disclosed for indirectly monitoring and controlling at least one media peripheral device in a media exchange network by accessing a media management system (MMS) via a first media peripheral (MP) device (e.g., a TV screen) using a user control device (e.g., a remote control). An operation corresponding to a second media peripheral (MP) device (e.g., a digital camera) may be selected via the MMS using the first MP device and the user control device. The operation is then carried out (i.e., performed) by the second MP device. A status of the second MP device may be selected via the MMS using the first MP device and the user control device. The selected status is then displayed on the first MP device.

43 Claims, 16 Drawing Sheets

U.S. PATENT DOCUMENTS

| | | | |
|---|---|---|---|
| 7,080,400 B1 * | 7/2006 | Navar | 725/139 |
| 7,234,117 B2 * | 6/2007 | Zaner et al. | 715/758 |
| 2002/0016971 A1 | 2/2002 | Berezowski | |
| 2003/0004916 A1 * | 1/2003 | Lewis | 707/1 |
| 2003/0043272 A1 * | 3/2003 | Nagao et al. | 348/207.1 |
| 2003/0115585 A1 | 6/2003 | Barsness | |
| 2004/0003040 A1 | 1/2004 | Beavers | |
| 2004/0243671 A9 * | 12/2004 | Needham et al. | 709/204 |
| 2007/0174886 A1 * | 7/2007 | Scheuer et al. | 725/110 |
| 2007/0198738 A1 * | 8/2007 | Angiolillo et al. | 709/231 |

OTHER PUBLICATIONS

Share it! Deliverable #3, Nov. 30, 2002, pp. 1-93.

* cited by examiner

MP Device Status Page

| MP Device 151 | battery level | power on/off | storage used | storage left | within range |
|---|---|---|---|---|---|
| Digital Camera | 80% | OFF | 30% | 70% | YES |
| Digital Camcorder | No Signal | No Signal | No Signal | No Signal | NO |
| MP3 Player | 50% | ON | 50% | 50% | YES |
| Multi-media PDA | 70% | OFF | 20% | 80% | YES |
| Home juke-box | N/A | ON | 45% | 55% | YES |
| First Home PC | N/A | ON | 35% | 65% | YES |
| Mobile Multi-media Gateway | 30% | OFF | 70% | 30% | YES |
| Second Home PC | No Signal | No Signal | No Signal | No Signal | NO |

Fig. 1C

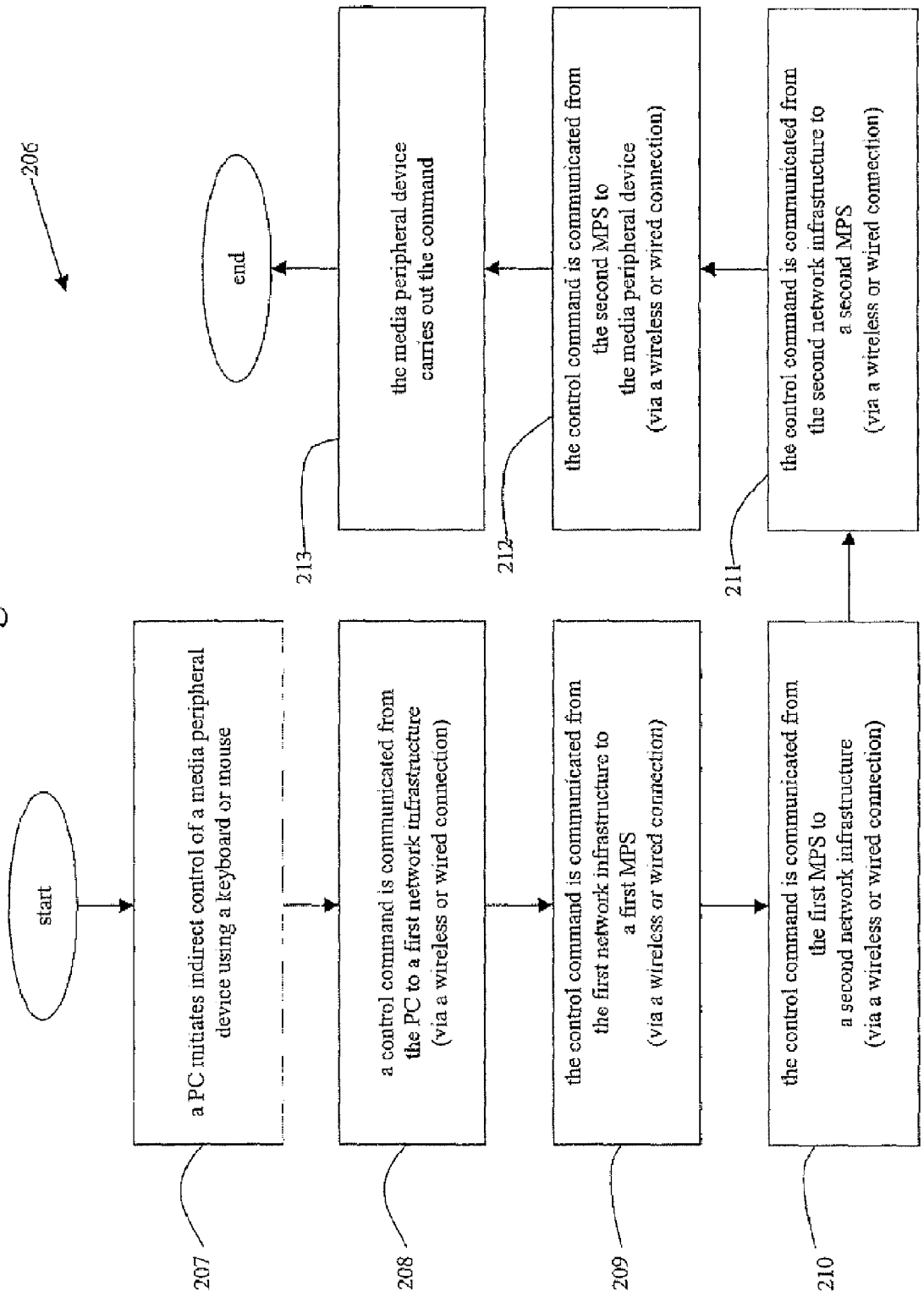

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

Fig. 8

PERSONAL ACCESS AND CONTROL OF MEDIA PERIPHERALS ON A MEDIA EXCHANGE NETWORK

CROSS-REFERENCE TO RELATED APPLICATIONS/INCORPORATION BY REFERENCE

This application is a continuation of co-pending U.S. patent application No. 10/660,267 entitled "PERSONAL ACCESS AND CONTROL OF MEDIA PERIPHERALS ON A MEDIA EXCHANGE NETWORK", filed Sep. 11, 2003, which makes reference to, claims priority to, and claims the benefit of United States Provisional Application Ser. No. 60/432,472 filed on Dec. 11, 2002 and U.S. Provisional Application Ser. No. 60/443,894 filed on Jan. 30, 2003. The above stated applications are hereby incorporated herein by reference in their entirety. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

U.S. patent application Ser. No. 10/657,390 filed on Sep. 8, 2003, is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Digital media devices may be battery powered, portable or mobile devices that are designed to operate while in motion ("roaming digital media devices"), or may be designed for operation while in a fixed location and usually connected to a power outlet ("stationary digital media devices"). Typical digital media devices, including media capture and player devices such as video and image cameras, audio recorders, and video, audio and image players, are designed for direct user control.

Direct control of such digital media devices occurs manually through buttons, switches and keypads on the digital media device or on an associated remote control device. With direct control, users have access to a wide set of device commands and trick modes, such as power on or off, play, rewind, capture, erase, delete, zoom, rewind, skip, sleep, standby, volume, brightness, modes, scan, etc. Direct access to media (for playback, review, etc.) in typical digital media devices is but one result of direct control.

Many of such digital media devices also use displays, light emitting diodes, and other visual components to assist the user in carrying out direct control. Audible or audio components are also often employed to assist.

Most digital media devices offer no means for indirect control, and, for those that do, the indirect control is very limited and difficult to use. Indirect control is control that is initiated from an independent device that may or may not be operated by a user. Independent devices do not include remote control devices that communicate directly with the digital media device (associated remote control devices).

A personal computer (PC) is an exemplary independent device that is often used to indirectly access media stored on a digital media device via a wired link. The indirect control of such digital media devices involves the: (1) exchange of media meta information, e.g., media file names, sizes, dates, resolution and format; (2) uploading of media to the digital media device; or (3) downloading of media from the digital media device. Through such indirect control, a user is able to extract media for printing, routing, or processing or load media for playback or review. Even so, the overall process for doing so is not easy.

For example, to route images to a friend, a user removes a digital camera from its case and through direct control turns on the power, adjusts settings and captures images. Afterwards, the user through direct control turns off the power and returns the camera to its case. Later, when within range of a PC, the user: (1) removes the digital camera from its case; (2) attaches a cable between the PC and the digital camera; (3) powers up the digital camera using direct control; (4) places the camera in a download mode using direct control; (5) runs a PC application that, using indirect control, copies the image files from the digital camera to the PC via the cable; (6) powers down the digital camera using direct control; (7) removes the cable; (8) places the camera into its case; (9) exits the PC application; (10) establishes an Internet connection; (11) runs an e-mail program on the PC; and (12) creates and sends an e-mail with the image files attached. This process is very tedious and time consuming, and, especially when problems arise, requires a fairly savvy user.

Occasionally, a user may want to determine certain status of a digital media device such as, for example, model number, software/firmware version, settings, and capabilities. As a result, the user may have to manually examine the digital media device or read through much of the user's manual of the digital media device. Also, in order to discover a battery charge level or a stored image status, for example, of a digital media device, a user may have to find, unpack, and examine the digital media device.

Many times, a user may quickly grab a digital media device such as, for example, a digital camera, only to discover that the digital camera is not ready to use because the charge of the battery pack is low. A user may have to keep a digital media device plugged into a wall socket while not using the digital media device to ensure that a battery pack of the digital media device is charged.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention relate to indirectly monitoring and controlling media peripheral devices on a media exchange network. As defined herein, a media peripheral device includes any device comprising a processor and media capture software and/or media player software. Also, a PC monitor, a TV screen, and any display device are considered media peripheral devices herein.

Aspects of the present invention may be seen in a system supporting the indirect control of at least one media peripheral. Such a system may comprise a first television display in a first home, a first storage in the first home for storing media, a second storage in the second home, and at least one media peripheral, in the second home. The first storage may have an associated first network protocol address, the second storage may have an associated second network protocol address, and the at least one media peripheral may be communicatively coupled to the second storage. An embodiment of the present invention may also comprise server software that receives via a communication network a request that identifies one of the associated first and second network protocol addresses. The request may also identify one of the at least one media peripheral, and at least one media peripheral command selected by a user at the first home.

In an embodiment in accordance with the present invention, the server may respond by identifying the other of the associated first and second network protocol addresses. In this manner, the server may support control from the first home, via the communication network, of the identified one of the at least one media peripheral, at the second home, according to the at least one media peripheral command. The first and second network protocol addresses may be one of an Internet protocol (IP) address, a media access control (MAC) address, and an electronic serial number (ESN). The at least one media peripheral may comprise at least one of a digital camera, a digital camcorder, an MP3 player, a home juke-box system, a multi-media personal digital assistant (PDA), a mobile multi-media gateway device. The media may comprise at least one of audio, a still image, video, and data, and the media may comprise real-time video. The at least one media peripheral command may comprise at least one of on, off, select, play, capture, download, erase, delete, zoom, focus, pan, tilt, set compression format, set resolution, set frame rate, set quality, rewind, fast forward, scan, list, skip, and check status.

In an embodiment of the present invention, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. An embodiment of the present invention may also comprise a user interface, at the first home, for identifying at least one of the second home, the at least one media peripheral, and the at least one media peripheral command, and the user interface supporting at least one media channel.

Additional aspects of the present invention may be found in a system supporting the indirect control of at least one media peripheral. Such an embodiment may comprise a first storage in the first home that stores media, and a second storage in the second home. The first storage may have an associated first network address, and the second storage may have an associated second network address. An embodiment of the present invention may also comprise set top box circuitry, in the first home, communicatively coupled to the first storage and the second storage, and at least one media peripheral, in the second home, communicatively coupled to the second storage.

An embodiment of the present invention may also comprise server software. The server software may receive a request that identifies one of the associated first and second network addresses, one of the at least one media peripheral, and at least one media peripheral command. The server may respond by identifying the other of the associated first and second network addresses to support control, via a communication network, of the identified one of the at least one media peripheral, according to the at least one media peripheral command. The media may comprise at least one of audio, a still image, video, and data, and the at least one media peripheral may comprise at least one of a digital camera, a digital camcorder, an MP3 player, a home juke-box system, a multi-media personal digital assistant (PDA), a mobile multi-media gateway device.

In an embodiment of the present invention, the first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The server software in an embodiment of the present invention may forward media from the at least one media peripheral to the set top box circuitry. The server software may be at a location separate from the first home and the second home.

Further aspects of the present invention may be observed in a system supporting the indirect control of at least one media peripheral. Such an embodiment may comprise a first storage, in a first home, that stores media, and at least one media peripheral, in a second home. The system may also comprise set top box circuitry, in the first home, communicatively coupled via a communication network, to exchange media between the first storage and the at least one media peripheral. An embodiment may also comprise server software that supports the delivery of at least one media peripheral command to the at least one media peripheral, and the exchange of media between the at least one media peripheral and the set top box circuitry.

In an embodiment of the present invention, the media may comprise at least one of audio, a still image, video, real-time video, and data. The at least one media peripheral command may comprise at least one of on, off, select, play, capture, download, erase, delete, zoom, focus, pan, tilt, set compression format, set resolution, set frame rate, set quality, rewind, fast forward, scan, list, skip, and check status. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The at least one media peripheral may comprise at least one of a digital camera, a digital camcorder, an MP3 player, a home juke-box system, a multi-media personal digital assistant (PDA), a mobile multi-media gateway device.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1C is a diagram illustrating an embodiment of a media peripheral device status page showing status information of various media peripheral devices on the media exchange network of FIG. 1A, in accordance with various aspects of the present invention.

FIG. 2B is a flowchart illustrating a more specific embodiment of the method of FIG. 2A for indirectly controlling a media peripheral device on the media exchange network of FIG. 1A, in accordance with various aspects of the present invention.

FIG. 8 is an exemplary illustration of a media guide user interface showing several options of a pushed media in accordance with an embodiment of the present invention.

DETAILED DESCRIPTION OF THE INVENTION

Figure 1A:
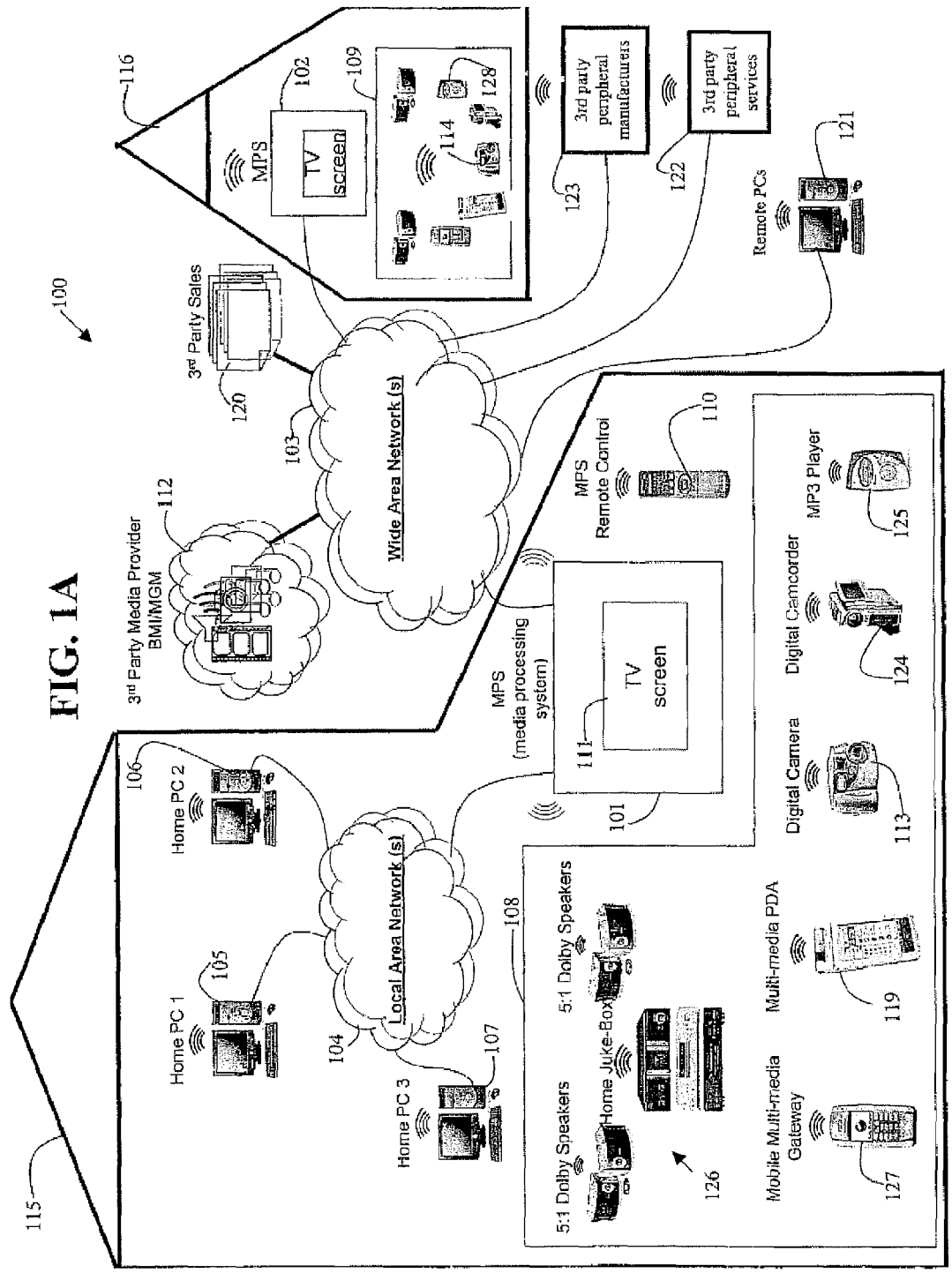
FIG. 1A is a diagram illustrating an embodiment of a media exchange network supporting access, monitoring, and control of media peripheral devices, in accordance with various aspects of the present invention.

FIG. 1A is a diagram illustrating an embodiment of a media exchange network 100 supporting access, monitoring, and control of media peripheral devices (e.g., 108 and 109), in accordance with various aspects of the present invention. Specifically, the media exchange network 100 is a communication network comprising a first MPS (media processing system) 101 located in a home location 115 of the media exchange network 100, a second MPS 102 at a remote location 116, WAN(s) ("Wide Area Network(s)") 103, and LAN(s) ("Local Area Network(s)") 104. The MPS 101 may interface wirelessly or via a wired connection to both LAN(s) 104 and WAN(s) 103. Similarly, MPS 102 may interface wirelessly or via a wired connection to WAN(s) 103. Remote location 116 may be, for example, a user's second home, a friend's home, or a family member's home.

The media exchange network 100 also includes several PCs ("personal computers") 105, 106, and 107 in the home location 115 of the media exchange network 100 that interface wirelessly or via a wired connection to the LAN(s) 104. The PC's may comprise desktop PC's, notebook PC's, PDA's, or any computing device. The media exchange network 100 further comprises a first plurality of media peripheral devices 108 at the home location 115, and a second plurality of media peripheral devices 109 at the remote location 116. The first plurality of media peripheral devices 108 may interface wirelessly or via a wired connection to the MPS 101 in any combination. Similarly, the second plurality of media peripheral devices 109 may interface wirelessly or via a wired connection to the MPS 102 in any combination.

The media peripheral devices (108, 109) may include a digital camera 113, a digital camcorder 124, a MP3 player 125, a home juke-box system 126, a multi-media PDA (personal digital assistant) 119, and a mobile multi-media gateway device 127. The MPS's (101, 102) may include a TV screen 111 for viewing various types of media and for controlling and accessing the various media peripheral devices.

Furthermore, the media exchange network 100 comprises a $3^{rd}$ party media providers) 112, a $3^{rd}$ party sales provider(s) 120, a remote computer(s) 121, a 3rd party peripheral service (s) 122, and a $3^{rd}$ party peripheral manufacturer(s) 123 all interfacing wirelessly or via a wired connection to the WAN (S) 103.

The LAN(s) 104 may comprise, for example, a home cable infrastructure, an Ethernet infrastructure, an 802.11b wireless infrastructure, or a home PNA (phoneline networking alliance) infrastructure, providing peer-to-peer networking capability within the home location 115.

The WAN(s) 103 may include cable infrastructure, DSL infrastructure, Internet infrastructure, or intranet infrastructure in order to provide communications between, for example, the home location 115, the remote location 116, and third party locations 112, 120, 121, 122, 123. Entities within the LAN 103 and the WAN 104 may be identified using network or protocol addresses such as, for example, Internet protocol (IP) addresses, media access control (MAC) addresses, and electronic serial numbers (ESN's).

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention. An MPS is also known, herein, as a media-box and/or an M-box.

Any of the PC's (105, 106, 107, 121) may indirectly access and control any of the plurality of media peripheral devices (108, 109). Such access and control may be accomplished in communication pathways via the MPS's (101' 102) or outside of the MPS's (101, 102). Similarly, any of the MPS's (101, 102) may indirectly access and control any of the media peripheral devices (108, 109) via a remote control 110 interacting with a TV screen 111, or outside thereof.

Today, TV is typically only used for media consumption, not to control media peripheral devices without performing media consumption. An MPS may or may not be the beneficiary or initiator of media peripheral device controls.

There are many types of indirect control commands available to manipulate the various media peripheral devices. Each media peripheral device may have particular indirect commands unique to that device or type of device. Many of the indirect commands will find parallels to the available direct commands. Exemplary commands include turning media peripheral devices 108 and/or 109 on and off, initiating play, capture, select, erase/delete, zoom, focus, pan, tilt, fast forward, rewind, scan, list, skip, etc.

Media peripheral devices may be controlled from a TV screen 111 or a PC 105 via user interaction, in accordance with an embodiment of the present invention. For example, a user may initiate checking of battery levels of the media peripheral devices through his TV screen.

Figure 1B:
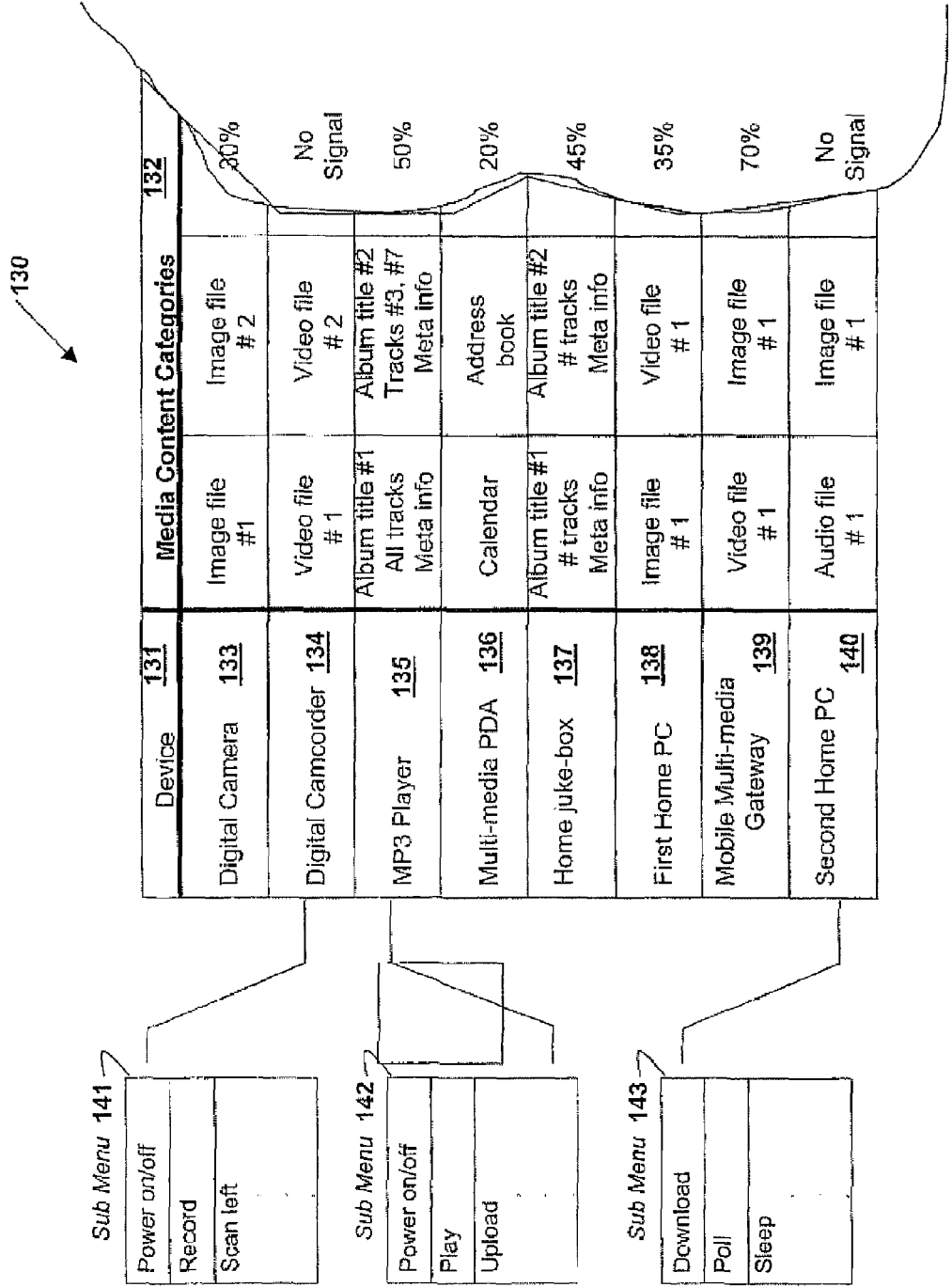
FIG. 1B is a diagram illustrating an embodiment of a device view with drop down menus for controlling media peripheral devices on the media exchange network of FIG. 1A, in accordance with various aspects of the present invention.

FIG. 1B is a diagram illustrating an embodiment of a device view 130 with drop down menus for controlling the operation of media peripheral devices on the media exchange network 100 of FIG. 1A, in accordance with various aspects of the present invention. The device view 130 comprises a table of media peripheral device options 131 versus media content categories 132 (e.g., image files, video files, audio files, album titles) for each of the media peripheral devices. The media peripheral device options 131 listed in the device view 130 include a digital camera option 133, a digital camcorder option 134, a MP3 player option 135, a multi-media PDA option 136, a home juke-box option 137, a first home PC option 138, a mobile multi-media gateway option 139, and a second home PC option 140.

In accordance with an embodiment of the present invention, a user may call up the device view 130 on a TV screen of a MPS, using a remote control, or on the monitor of a PC, using a keyboard or mouse, on the media exchange network 100. The user may select a device option from the device view 130 in order to display a drop-down sub-menu (e.g., sub-menu 141). A sub-menu provides access, control, and monitoring command options to the user for that device.

For example, referring to FIG. 1A and FIG. 1B, a user of the MPS 101 may call up the device view 130 on the TV screen 111 using the remote control 110 and select the digital camcorder option 134 on the device view 130. The device view 130 may be stored in the MPS 101, in accordance with an embodiment of the present invention. The sub-menu 141 appears on the TV screen 111 and the user selects the "power on/off" option to power the digital camera 113 on. As another example, a user of the PC 107 may call up the device view 130 on a monitor of the PC 107 using a keyboard and select the MP3 player option 135 on the device view 130. The sub-menu 142 appears on the PC monitor and the user selects the "play" option to play the songs digitally stored in the MP3 player 125.

As a further example, a user of the MPS 102 at the remote location 116 may call up the device view 130 on the TV screen of the MPS 102 using a remote control and select the second home PC option 140 on the device view 130. The sub-menu 143 appears on the TV screen of the MPS 102 and the user selects the "download" option to begin the process of downloading an image file from the PC 105 at the home location 115 via the LAN 104, the MPS 101, and the WAN 103. Such remote access may require permission to be granted, in accordance with an embodiment of the present invention. Other sub-menu options are available as well such as, for example, a "check status" option that allows a user to check the status of a media peripheral device, a "change resolution" option that allows a user to change a digital file resolution of a MP device, and a "frame rate" option that allows a user to change an acquisition frame rate of a MP device.

FIG. 1C is a diagram illustrating an embodiment of a media peripheral device status page 150 showing status information of various media peripheral devices on the media exchange network 100 of FIG. 1A, in accordance with various aspects of the present invention. The media peripheral device status page 150 comprises a table of media peripheral device options 151 versus status information categories 152 and allows a user to view the status of multiple media peripheral devices on the media exchange network 100. The status information categories 152 may include, for example, "battery level", "power on/off", "storage used", "storage left", and "within range".

"Battery level" refers to the percent of full charge remaining on the battery or power pack of the media peripheral device. "Power on/off" indicates the power state of the media peripheral device (i.e., ON or OFF). "Storage used" refers to the percent of total digital storage space that has been used in the media peripheral device. "Storage left" refers to the percent of total digital storage space remaining (i.e., unused) in the media peripheral device. Finally, "within range" refers to whether or not the media peripheral device is currently able to access the polling device (e.g., MPS or PC). The polling device is the device that is trying to access the status information from the media peripheral device. If the polling device cannot currently access a certain media peripheral device, the MP device status page 150 will indicate "NO" under the "within range" category for that MP device. Otherwise, the indication will be "YES".

In accordance with an embodiment of the present invention, a user may call up the MP device status page 150 on a TV screen of a MPS, using a remote control, or on the monitor of a PC, using a keyboard or mouse, on the media exchange network 100. The user may then view the status of each media peripheral device in the MP device status page 150 for each status information category 152 (assuming the MP device is within range). For example, the user may look under "battery level" for the multi-media PDA option and discover that the battery level for the multi-media PDA 119 is at 70% of full charge. As another example, the user may look under "storage left" for the digital camera option and discover that the amount of digital storage space remaining is 70% in the digital camera 13.

Figure 2A:
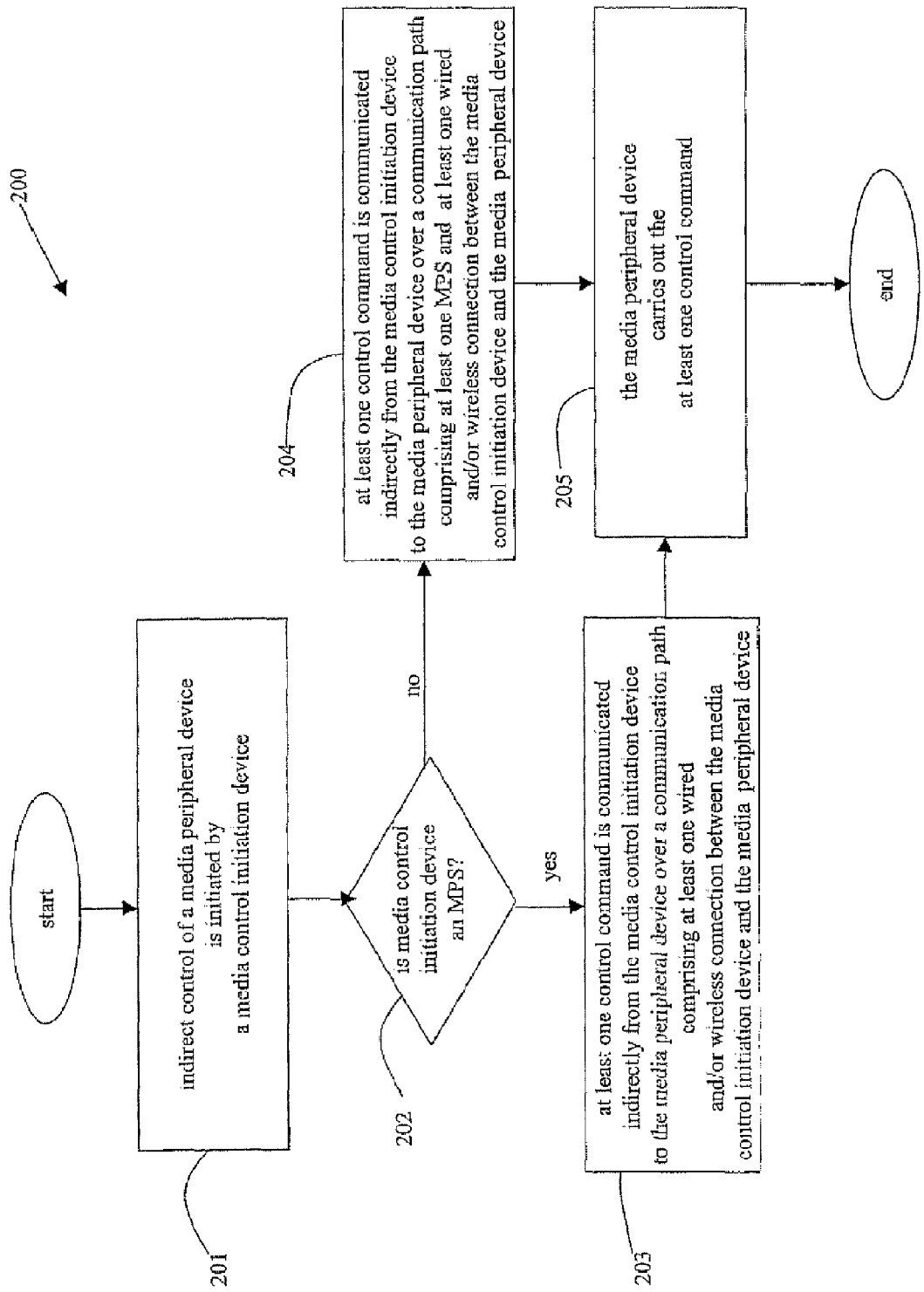
FIG. 2A is a flowchart illustrating a general embodiment of a method for indirectly controlling a media peripheral device on the media exchange network of FIG. 1A, in accordance with various aspects of the present invention.

FIG. 2A is a flowchart 200 illustrating a general embodiment of a method, using the media exchange network 100 of FIG. 1A, for indirectly controlling a media peripheral device, in accordance with certain aspects of the present invention. In step 201, indirect control of a media peripheral device is initiated by a media control initiation device. The media control initiation device may comprise, for example, a MPS, a PC, or another media peripheral device. The media peripheral device may comprise, for example, a digital camera, a digital camcorder, a MP3 player, a home juke-box system, a multi-media PDA, or a mobile multi-media gateway.

In step 202, a decision is made based on whether or not the media control initiation device is a MPS. If the media control initiation device is a MPS, then the method 200 proceeds to step 203, else the method 200 proceeds to step 204.

In step 203, at least one control command is communicated indirectly from the media control initiation device to the media peripheral device over a communication path comprising at least one wired and/or wireless connection between the media control initiation device and the media peripheral device. The at least one wired and/or wireless connection may comprise at least one local area network and/or at least one wide area network, or any combination thereof.

In step 204, at least one control command is communicated indirectly from the media control initiation device to the media peripheral device over a communication path comprising at least one MPS and at least one wired and/or wireless connection between the media control initiation device and the media peripheral device. The at least one wired and/or wireless connection may comprise at least one local area network and/or at least one wide area network, or any combination thereof. In step 205, the media peripheral carries out the at least one control command.

FIG. 2B is a flowchart 206 illustrating a specific embodiment of the method of FIG. 2A, using the media exchange network 100 of FIG. 1A, for indirectly controlling a media peripheral device, in accordance with certain aspects of the present invention. In step 207, a user of a PC (e.g., PC 106 at home location 15) initiates indirect control of a media peripheral device (e.g., digital camera 114 at remote location 116) using a keyboard or mouse.

In step 208, a control command (e.g., "power on") is communicated from the PC to a first network infrastructure (e.g., LAN(s) 104) via either a wireless or wired connection. In step 209, the control command is communicated from the first network infrastructure to a first MPS (e.g., MPS 101) via either a wireless or wired connection. In step 210, the control command is communicated from the first MPS to a second network infrastructure (e.g., WAN(s) 103) via either a wireless or wired connection.

In step 211, the control command is communicated from the second network infrastructure to a second MPS (e.g., MPS 102) via either a wireless or wired connection. In step 212, the control command is communicated from the second MPS to the media peripheral device via either a wireless or wired connection. In step 213, the media peripheral device carries out the command (i.e., performs the associated operation such that the digital camera 114 powers on).

In another example, a digital camera 113 may be placed on a table in the home location 115. A user of the PC 107 may command digital camera 113 to turn on using a keyboard. The command may be communicated to digital camera 113 wirelessly from PC 107. Next, the user of the PC 107 may initiate another command to digital camera 113, in a similar manner, instructing digital camera 113 to download image files from digital camera 113 to PC 107.

The management of memory, such as evaluating how much memory storage space is left in a media peripheral or moving and migrating media files, may be controlled using certain media peripheral commands. For example, a user of the MPS 101 may command digital camera 113 to turn on using a remote control. The command may be communicated to digital camera 113 wirelessly from MPS 101 using the TV screen 111 and remote control 110. Next, the user of the MPS 101 may initiate another command to digital camera 113, in a similar manner, instructing digital camera 113 to download image files from digital camera 113 to MPS 101.

As yet another example, a user of the PC 105 may command digital camera 113 to turn on using a mouse. The command may be communicated wirelessly from PC 105 to LAN(s) 104, and then through a wired connection from LAN(s) 104 to MPS 101. Finally, the command may be communicated wirelessly from MPS 101 to digital camera 713. Next, the user of the PC 105 may initiate another command to digital camera 113, in a similar manner, instructing digital camera 113 to download image files from digital camera 113 to MPS 101. Finally, the user of the PC 105 may initiate a third command to MPS 101 via LNA(s) 104, instructing MPS 101 to display the pictures in the image files on TV screen 111.

The digital camera 114 may have been left on a table at remote location 116 pointing out a window. A user may use remote control 110 at home location 115 to power on digital camera 114 and MPS 102 via MPS 101 and TV screen 111 from home location 115. The power-on commands may be initiated by the user of the MPS 101 and may be communicated from MPS 101 to WAN(s) 103 via a wired connection, and then from WAN(s) 103 to MPS 102 via a wired connection. Finally, the commands may be communicated from MPS 102 to digital camera 114 via a wireless connection. Next, the user of the MPS 101 may initiate another command, in a similar manner, to direct digital camera 114 to take pictures at remote location 116.

As yet another example, a user of the MPS 102 may command digital camera 113 to turn on and download image files to MPS 102. The commands may be communicated from MPS 102, using a remote control, to WAN(s) 103 via a wireless connection, and then from WAN(s) 103 to MPS 101 via a wired connection, and finally from MPS 101 to digital camera 113 via a wired connection.

As another example of indirect control, a user of the MPS 101 may command home juke-box system 126 to be turned on via a wireless connection using remote control 110 and TV screen 111. Next, the user of the MPS 101 commands the home juke-box system 126 to download a music file in a first format to MPS 101. The command is accomplished over the wireless connection between MPS 101 and home juke-box system 126. After the MPS 101 converts the music file from the first format to a second MP3 format, the user of the MPS 101 commands that MP3 player 125 at home location 115 and an MP3 player 128 at remote location 116 both be turned on. The command from the MPS 110 to the MP3 player 125 may be communicated via a wireless connection. The command from the MPS 101 to the MP3 player 128 at remote location 116 may be communicated first from the MPS 101 to the WAN(s) 103 via a wired connection, and then from the WAN(s) 103 to the MPS 102 via a wired connection, and finally from the MPS 102 to the MP3 player 128 at the remote location 116 via a wireless connection. As a result, the MPS 101 may follow up by downloading the music file in the second MP3 format to the MP3 player 125 at the home location 115 and to the MP3 player 128 at the remote location 116.

Certain media peripheral commands may be initiated by a user to perform feature interrogation such that a user can access the stats of a media peripheral (e.g., camera resolution, version number, model number, serial number, registration information, etc.). Also, a user may control a media delivery format such as a compression format, resolution, quality, etc. For example, a user of the MPS 101 may initiate a command to the digital camcorder 124 for the digital camcorder 124 to power on using a remote control. Next, the user of the MPS 101 may command the digital camcorder 124 to deliver a stats file to the MPS 101. The commands may be communicated via a wireless connection.

Figure 2C:
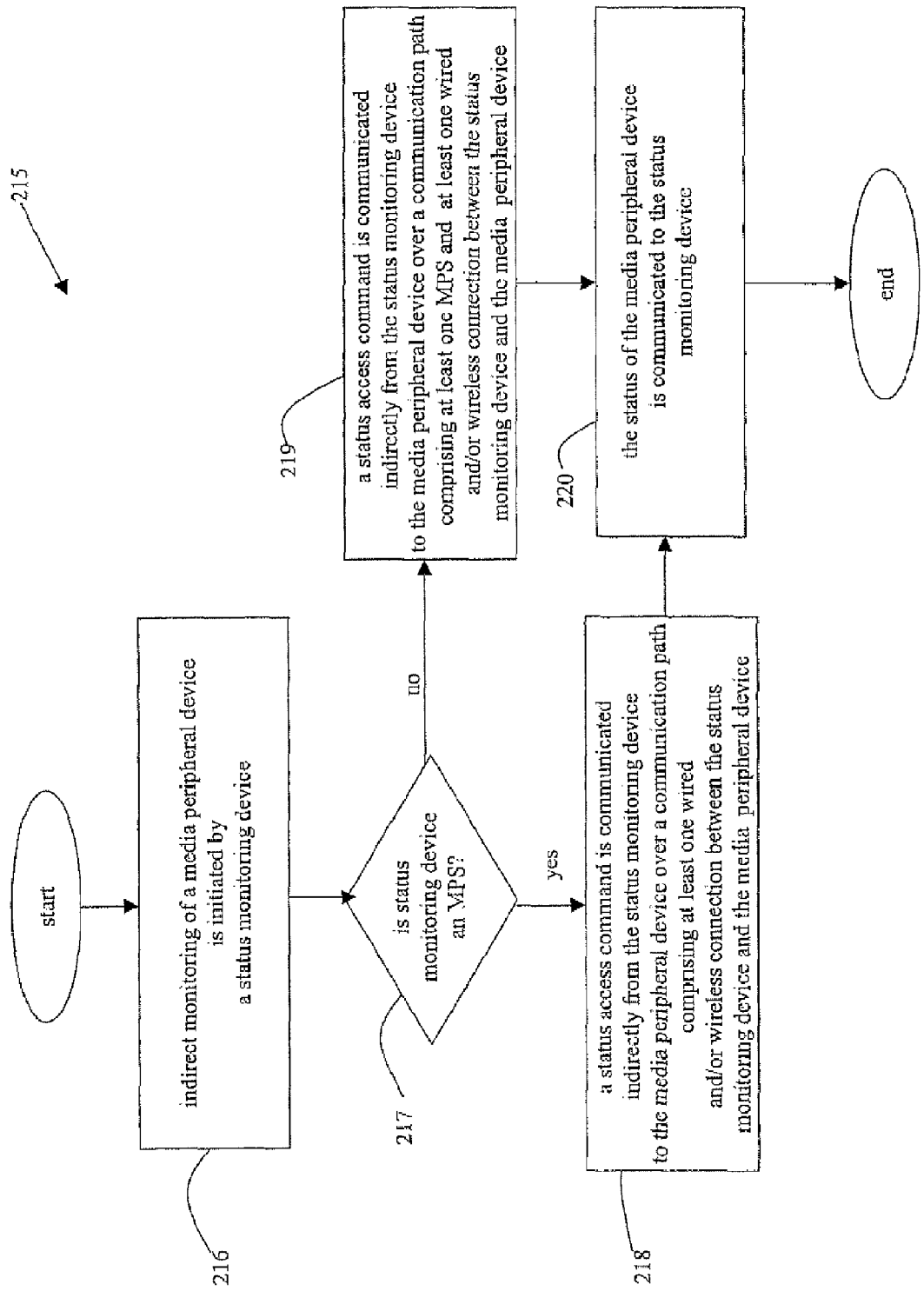
FIG. 2C is a flowchart illustrating an embodiment of a method for indirectly monitoring status information of media peripheral devices on the media exchange network of FIG. 1A, in accordance with various aspects of the present invention.

FIG. 2C is a flowchart illustrating an embodiment of a method 215 for indirectly monitoring status information of media peripheral devices on the media exchange network 100 of FIG. 1A, in accordance with various aspects of the present invention. In step 216 indirect monitoring of a media peripheral device is initiated by a status monitoring device (e.g., a MPS or a PC). In step 217, a decision is made as to whether or not the status monitoring device is an MPS. If the status monitoring device is a MPS, then the method 215 proceeds to step 218. Otherwise, the method 215 proceeds to step 219. In step 218, a status access command is communicated indirectly from the status monitoring device to the media peripheral device over a communication path comprising at least one wired and/or wireless connection between the status monitoring device and the media peripheral device. In step 219, a status access command is communicated indirectly from the status monitoring device to the media peripheral device over a communication path comprising at least one MPS and at least one wired and/or wireless connection between the status monitoring device and the media peripheral device. In step 220, the status of the media peripheral device is communicated to the status monitoring device.

In accordance with various embodiments of the present invention, a status monitoring device may comprise a MPS, a PC, or another media peripheral device.

As an example, a user of the MPS 101 initiates sending of a status access command to the home juke-box system 126 over a wireless connection using the remote control 110 and TV screen 111. The home juke-box system 126 responds to the status access command by sending status information back to the MPS 101. The status information may include, for example, a power on/off state, storage used, storage left, and a within range indication for the home juke-box system 126 and may be displayed on the TV screen 111.

As another example, a user of the MPS 102 at the remote location 116 initiates sending of a status access command to the MP3 player 125 at the home location 115 using a remote control and TV screen at the remote location 116. The status access command is transmitted over a wired connection to the WAN 103, then to the MPS 101, and finally over a wireless connection to the MP3 player 125. The MP3 player 125 responds to the status access command by sending status information back to the MPS 102. The status information may include, for example, a power on/off state, a battery level, storage used, storage left, and a within range indication for the MPS 125 and may be displayed on the TV screen of the MPS 102.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
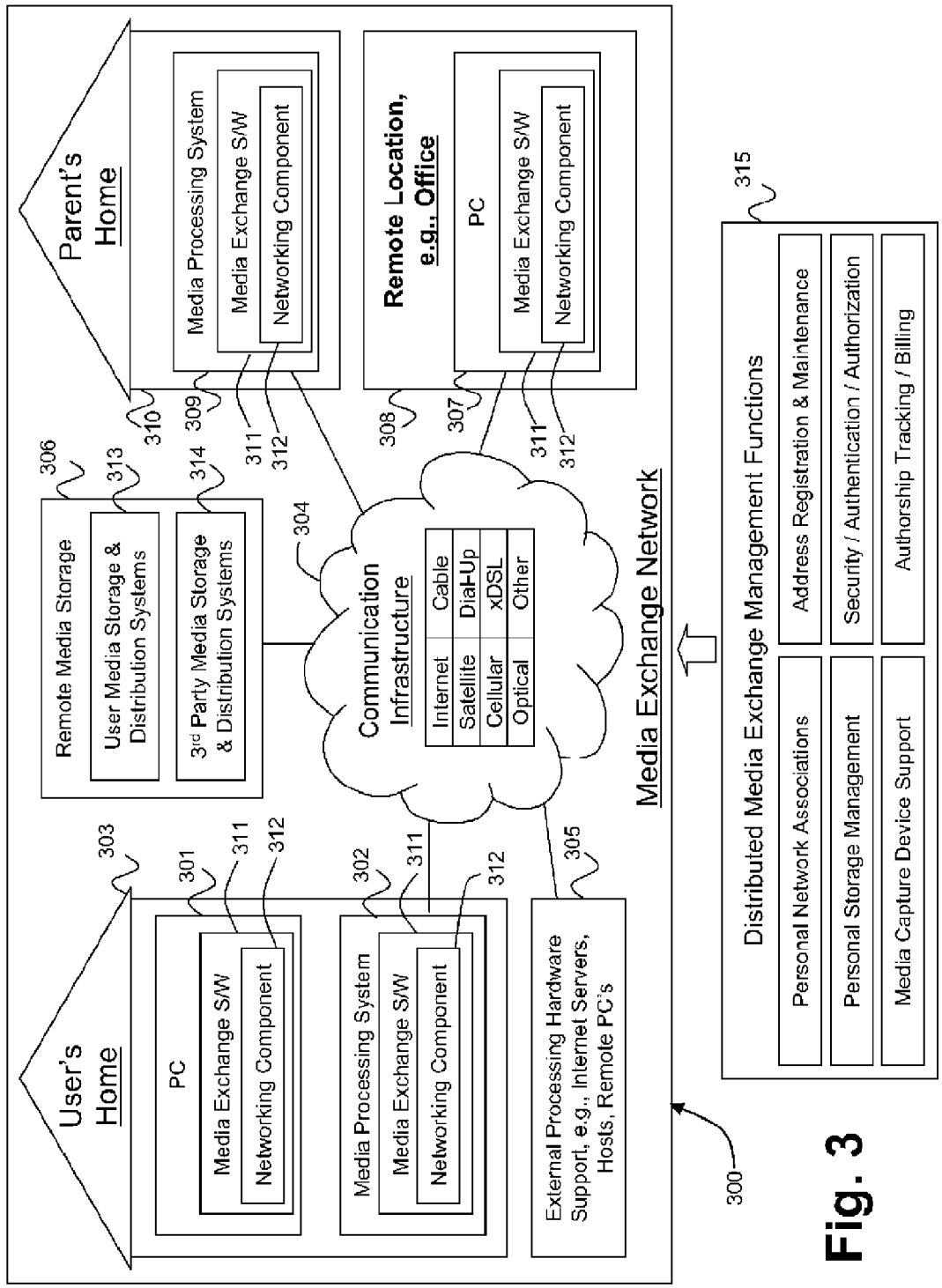
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
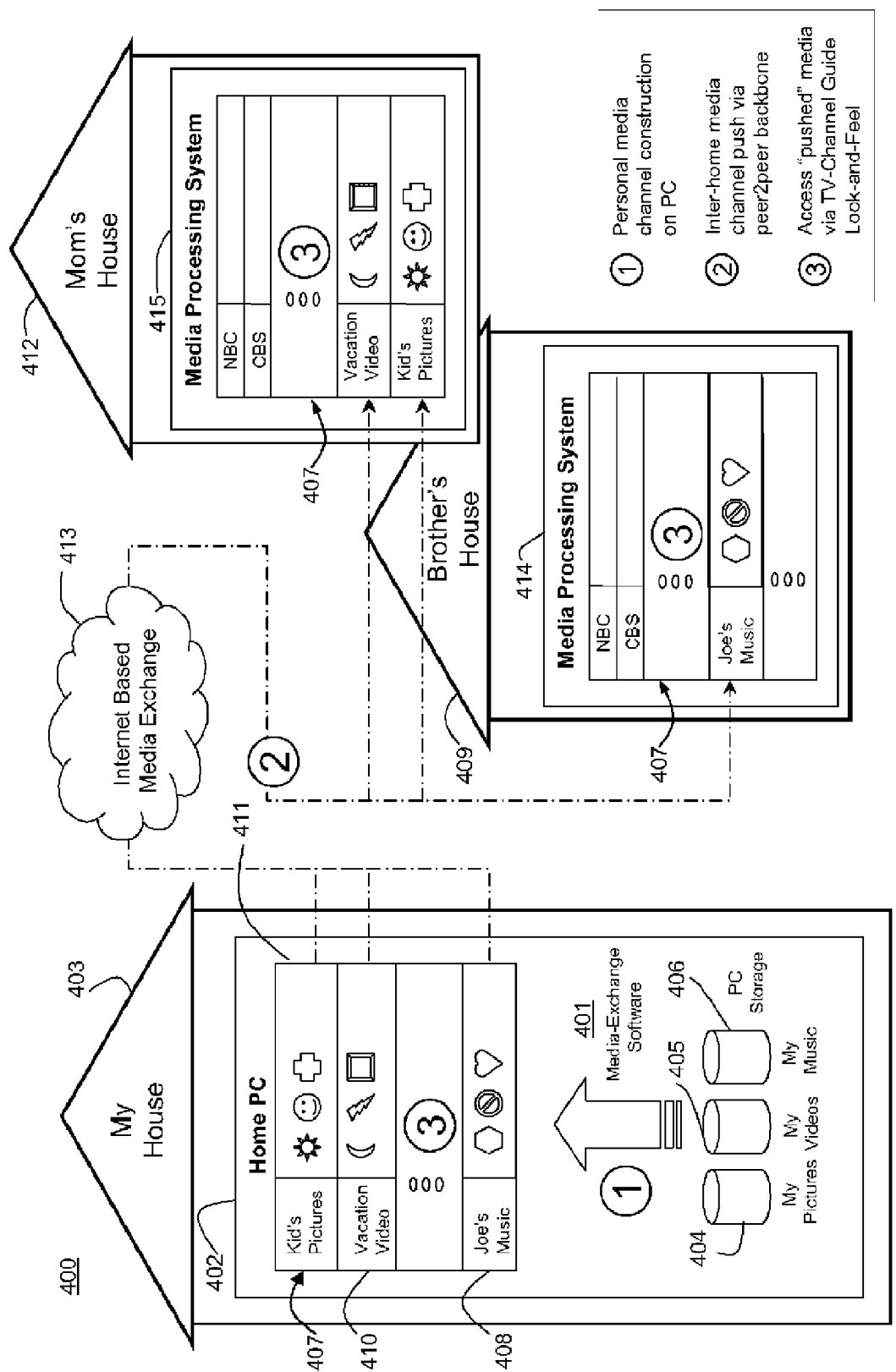
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
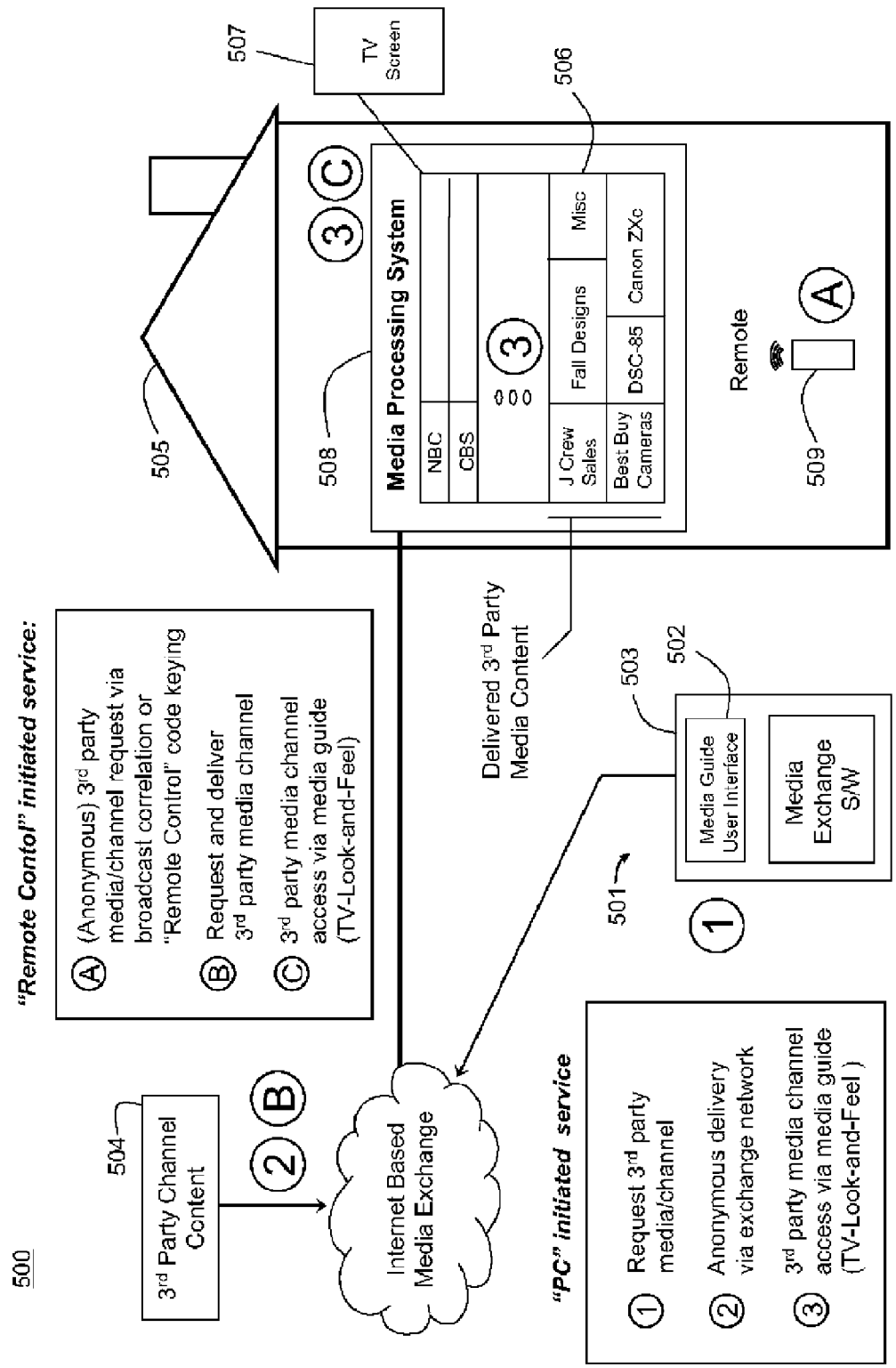
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
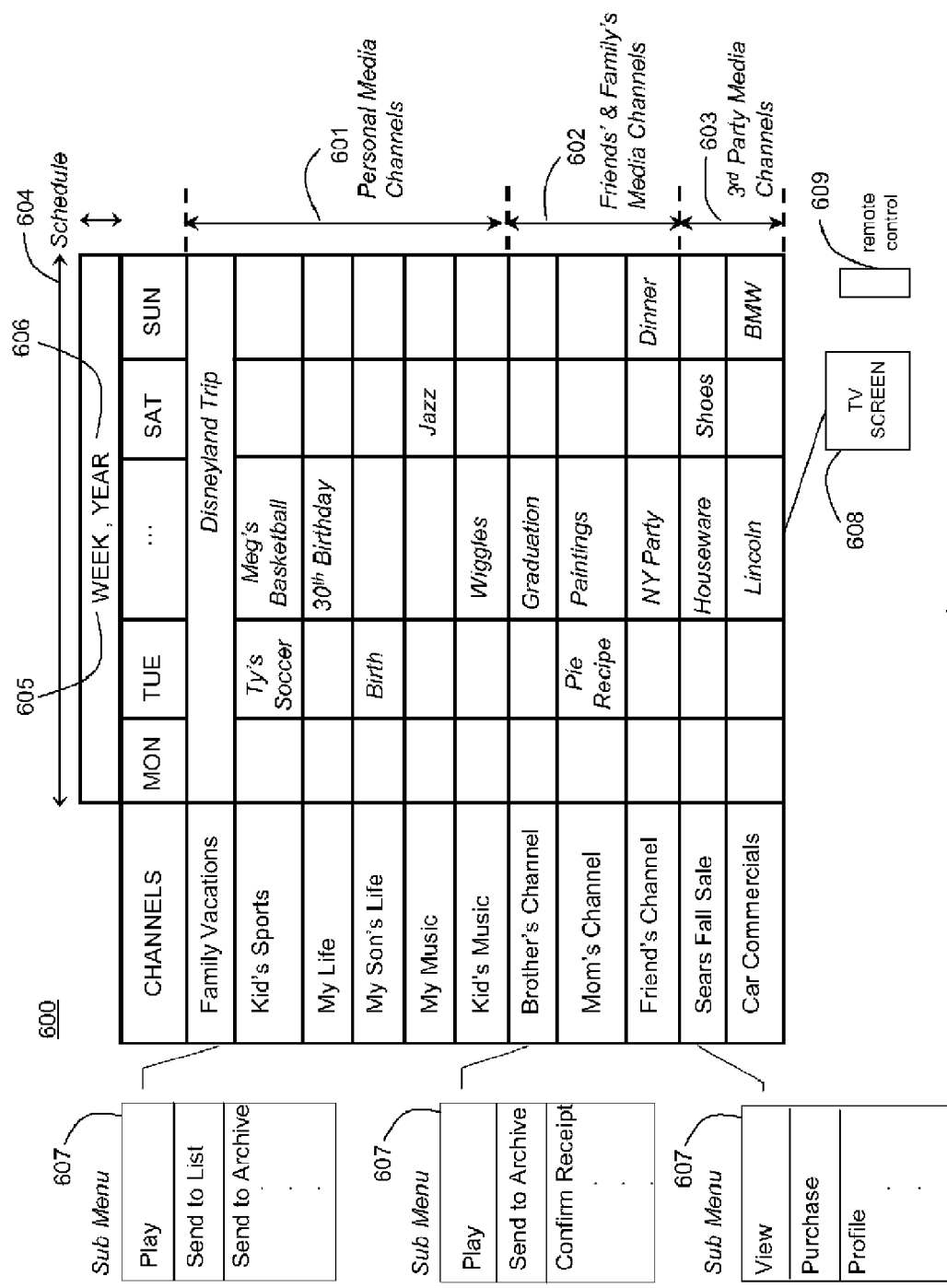
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
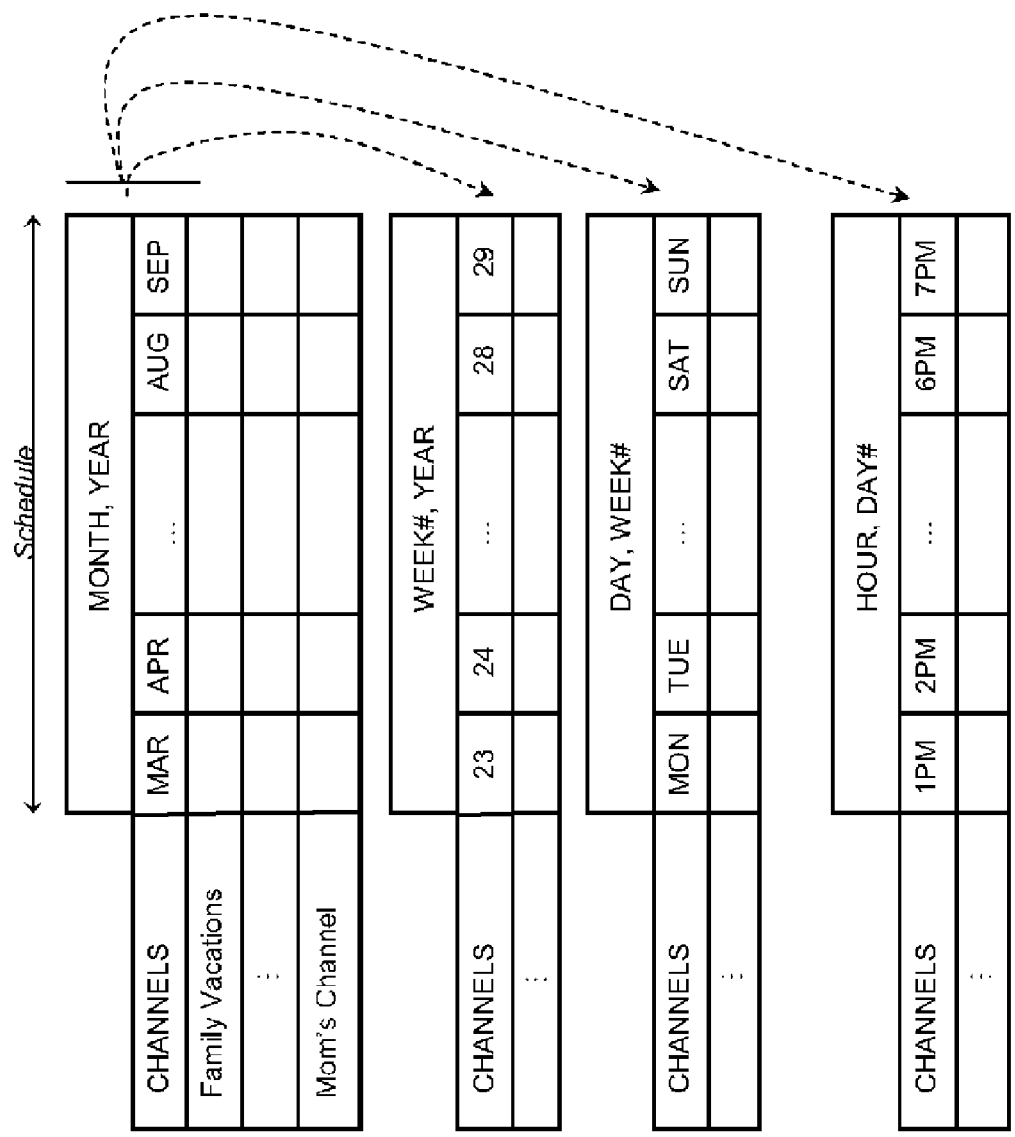
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
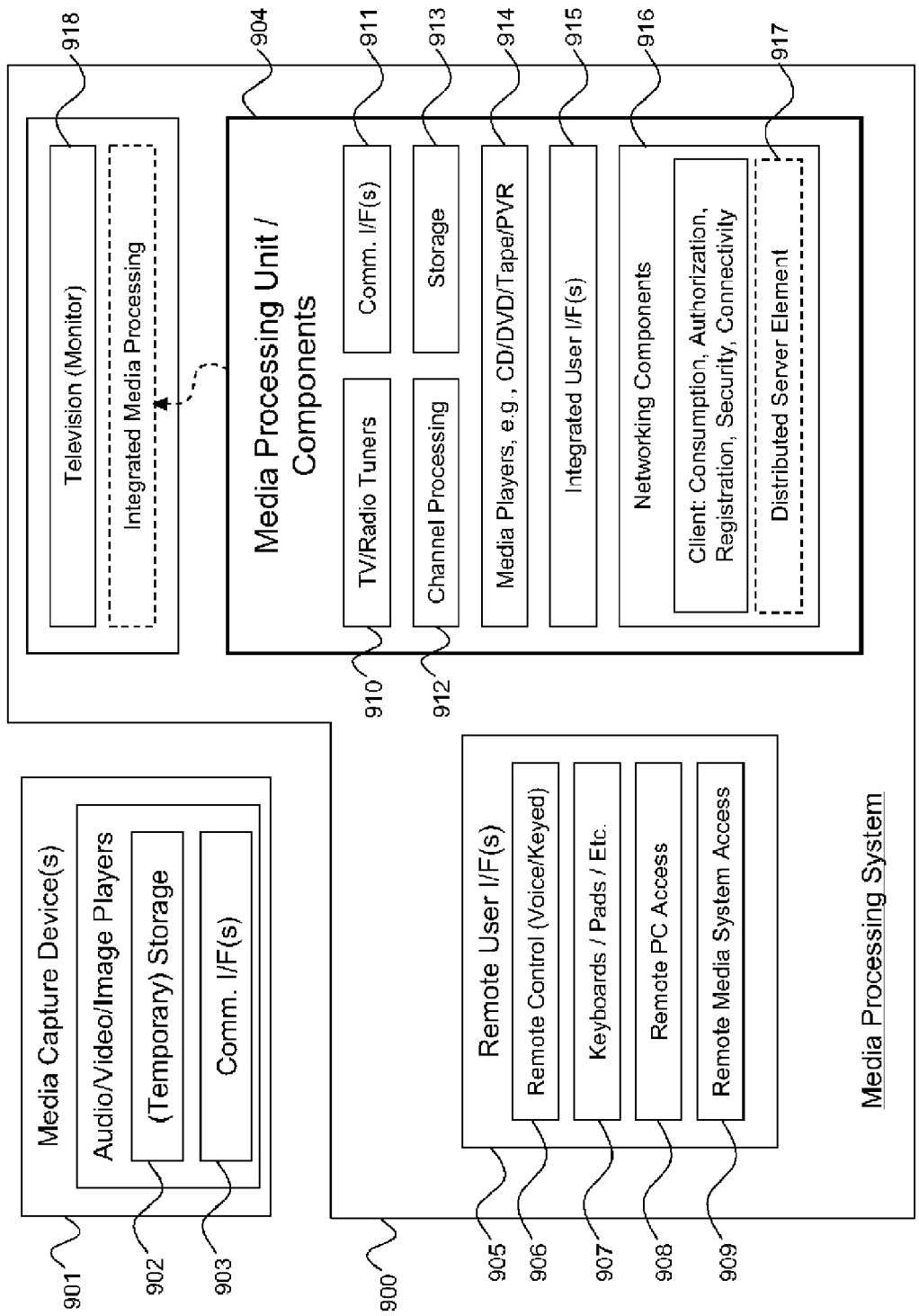
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for examples a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
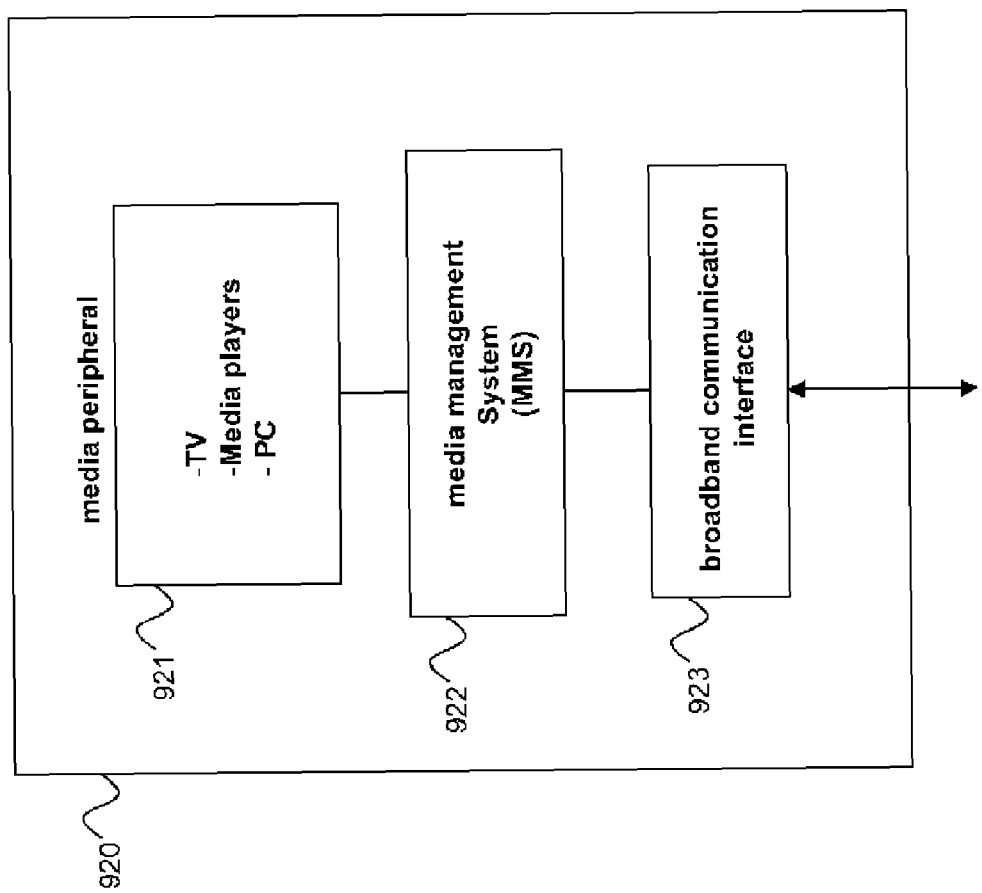
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
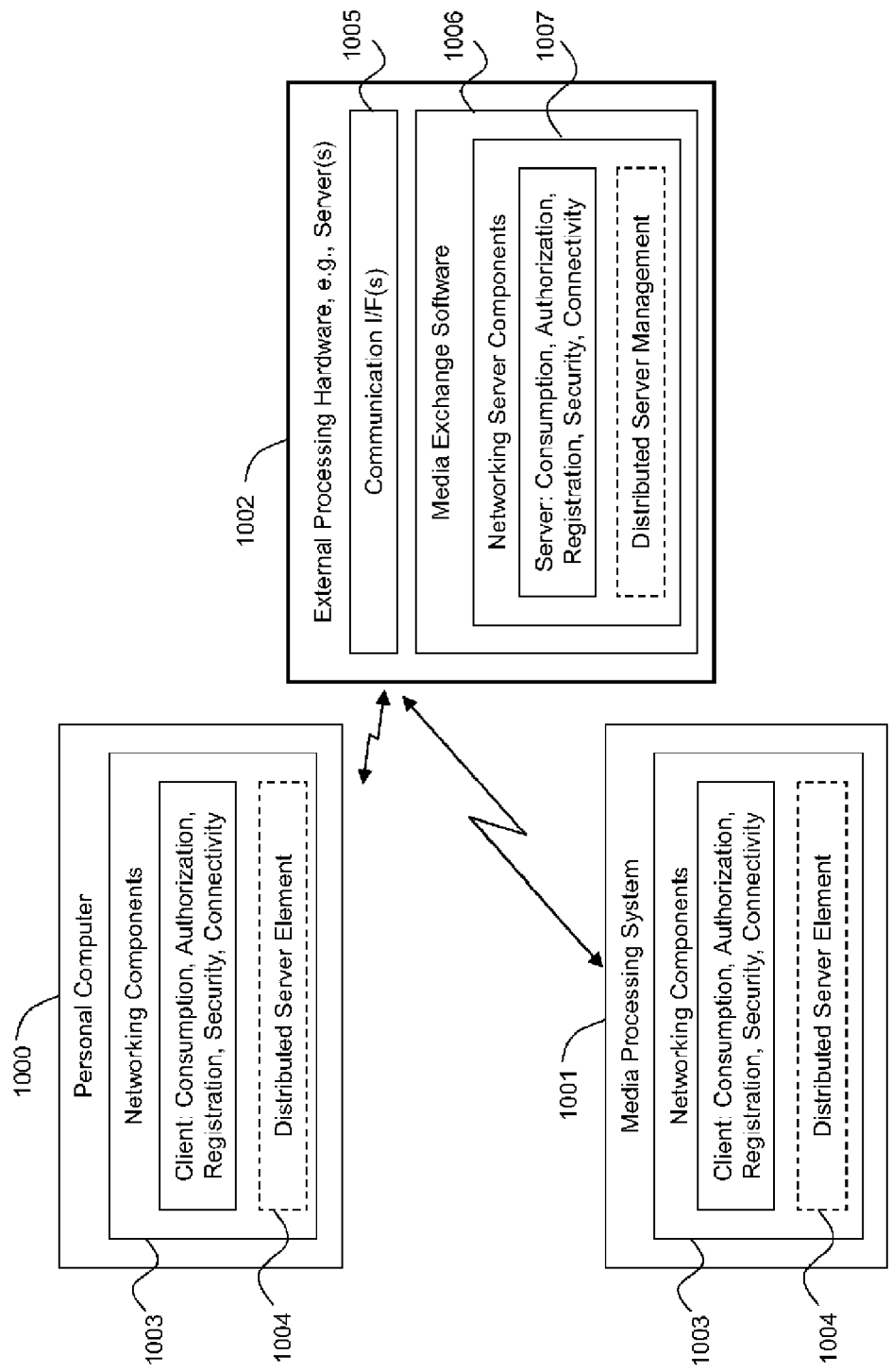
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
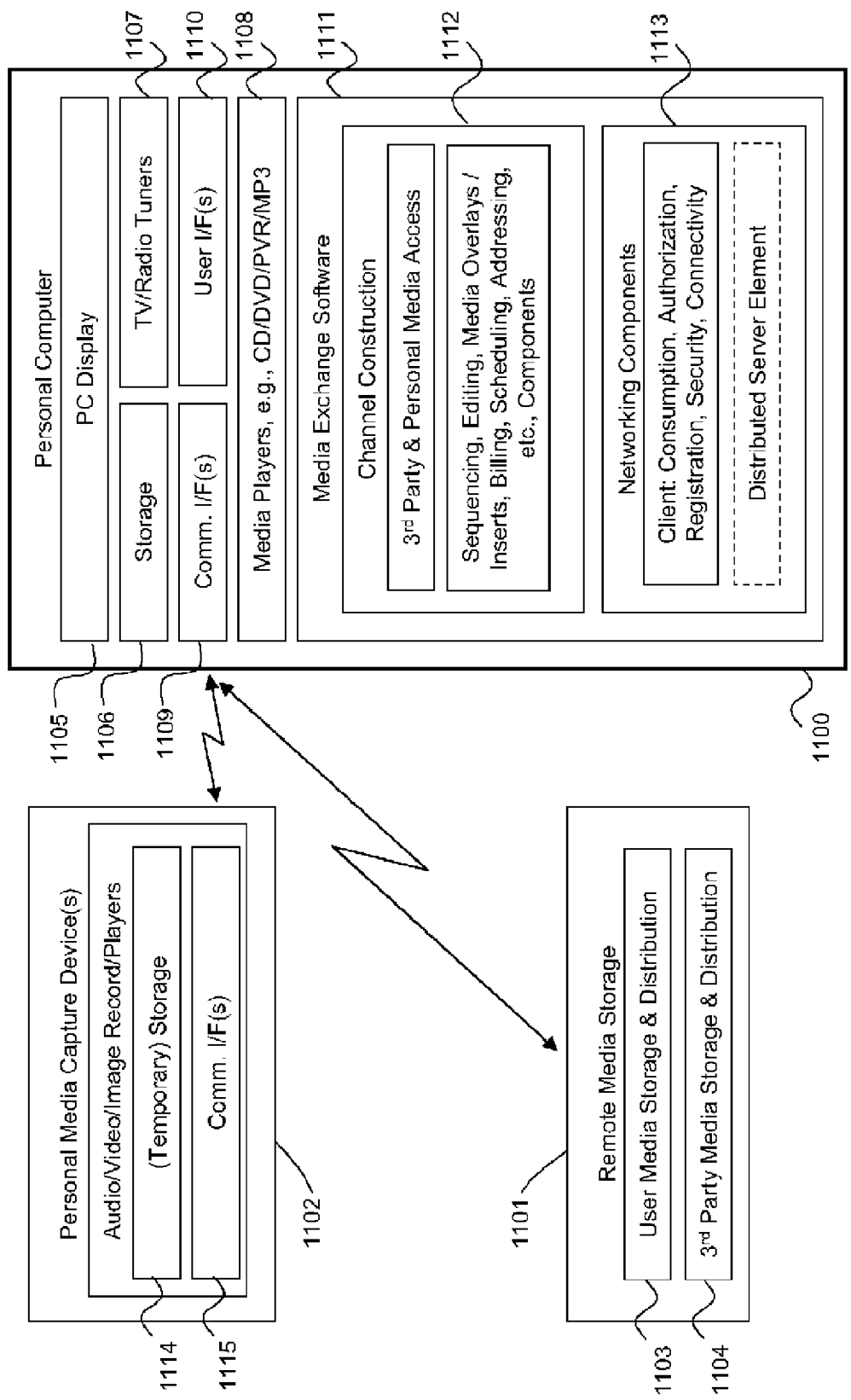
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Aspects of the present invention include a system and method that provides indirect access and control of media peripheral devices in a manner not previously accomplished. Certain embodiments of the present invention relate to various types of media peripheral device control and access, and various sources of initiation of media peripheral device control and access.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. One or more circuits for use in a system supporting the indirect control of at least one media peripheral, the one or more circuits comprising:

at least one processor operably coupled to a display device supporting display of television content and a first storage in a first home, the first storage for storing media and having a first network protocol address with respect to a first user in the first home, the at least one processor operable to, at least:

cause display of a user interface having at least one view comprising a representation of media available for consumption on the display device in the first home, the user interface supporting delivery of media from the first home to a second home having a second storage and at least one media peripheral communicatively coupled to the second storage, and having a second network protocol address with respect to a second user in the second home, wherein the second user is known to the first user; and communicate with server software that maintains a user defined association of the first and second network protocol addresses and that receives via a communication network a request that identifies one of the associated first and second network protocol addresses, one of the at least one media peripheral, and at least one media peripheral command selected by a user at the first home, and responds by identifying the other of the associated first and second network protocol addresses to support control from the first home, via the communication network, of the identified one of the at least one media peripheral, at the second home, according to the at least one media peripheral command.

2. The one or more circuits of claim 1 wherein the first and second network protocol addresses are one of an Internet protocol (IP) address, a media access control (MAC) address, or an electronic serial number (ESN).

3. The one or more circuits of claim 1 wherein the at least one media peripheral comprises one or more of a digital camera, a digital camcorder, an MP3 player, a home juke-box system, a multi-media personal digital assistant (PDA), and/or a mobile multi-media gateway device.

4. The one or more circuits of claim 1 wherein the media comprises one or more of audio, a still image, video, and data.

5. The one or more circuits of claim 1 wherein the media comprises real-time video.

6. The one or more circuits of claim 1 wherein the at least one media peripheral command comprises one or more of on, off, select, play, capture, download, erase, delete, zoom, focus, pan, tilt, set compression format, set resolution, set frame rate, set quality, rewind, fast forward, scan, list, skip, and/or check status.

7. The one or more circuits of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

8. The one or more circuits of claim 1 wherein the communication network is the Internet.

9. The one or more circuits of claim 1 wherein the user interface identifies at least one of the second home, the at least one media peripheral, and the at least one media peripheral command; and the user interface supports at least one media channel.

10. The one or more circuits of claim 9 where the at least one media channel comprises a user-selected sequence of media for consumption at one or both of the first home and/or the second home.

11. The one or more circuits of claim 9 wherein supporting at least one media channel comprises creation of the at least on media channel, including the display of a graphical representation of the at least one media channel on the user interface.

12. The one or more circuits of claim 1 wherein the display device comprises a television.

13. One or more circuits for use in a communication terminal supporting the indirect control of at least one media peripheral, the one or more circuits comprising:
at least one processor operably coupled to a display device supporting display of television content in a first home and communicatively coupled to a first storage that stores media in the first home and having a first network address with respect to a first user in the first home, and to a second storage in a second home, the second storage communicatively coupled to at least one media peripheral in the second home and having a second network address with respect to a second user in the second home, wherein the second user is known to the first user, the at least one processor operable to, at least:
cause display of a user interface on the display device in the first home, the user interface having at least one view comprising a representation of media available for consumption and supporting delivery of media from the first home to the second home; and
communicate with server software that maintains a user defined association of the first and second network addresses and that receives a request that identifies one of the associated first and second network addresses, one of the at least one media peripheral in the second home, and at least one media peripheral command selected at the first home, and responds by identifying the other of the associated first and second network addresses to support control, via a communication network, of the identified one of the at least one media peripheral, according to the at least one media peripheral command.

14. The one or more circuits of claim 13 wherein the media comprises one or more of audio, a still image, video, and/or data.

15. The one or more circuits of claim 13 wherein the at least one media peripheral comprises one or more of a digital camera, a digital camcorder, an MP3 player, a home juke-box system, a multi-media personal digital assistant (PDA), and/or a mobile multi-media gateway device.

16. The one or more circuits of claim 13 wherein the first and second network addresses are one of an Internet protocol (IP) address, a media access control (MAC) address, or an electronic serial number (ESN).

17. The one or more circuits of claim 13 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

18. The one or more circuits of claim 13 wherein the communication network is the Internet.

19. The one or more circuits of claim 13 wherein the server software forwards media from the at least one media peripheral to the circuitry of the communication terminal.

20. The one or more circuits of claim 13 wherein the communication terminal comprises a set top box device.

21. The one or more circuits of claim 13 wherein the server software is at a location separate from the first home and the second home.

22. The one or more circuits of claim 13 where the user interface supports at least one media channel that comprises a user-selected sequence of media for consumption at one or both of the first home and/or the second home.

23. The one or more circuits of claim 22 wherein supporting at least one media channel comprises creation of the at least on media channel, including the display of a graphical representation of the at least one media channel on the user interface.

24. The one or more circuits of claim 13 wherein the display device comprises a television.

25. One or more circuits for a communication terminal supporting the indirect control of at least one media peripheral, the one or more circuits comprising:
at least one processor operably coupled to a display device supporting display of television content, in a first home, and communicatively coupled to a first storage, in the first home, that stores media, and to at least one media peripheral, in a second home, the at least one processor operable to, at least:
cause display of a user interface on the display device in the first home, the user interface having at least one view comprising a representation of media available for consumption and supporting delivery of media from the first home to the second home;

transfer media between the first storage and the at least one media peripheral, via a communication network, the at least one media peripheral being configured to be indirectly controlled by the set top box circuitry in the first home; and communicate with server software that maintains a user define association of a first network protocol address with respect to a first in a first home and a second network protocol address with respect to a second user in a second home, wherein the first and second users know one another, the server software supporting the delivery of at least one media peripheral command to the at least one media peripheral, and the exchange of media between the at least one media peripheral and the communication terminal.

26. The one or more circuits of claim 25 wherein the media comprises one or more of audio, a still image, video, real-time video, and/or data.

27. The one or more circuits of claim 25 wherein the at least one media peripheral command comprises one or more of on, off, select, play, capture, download, erase, delete, zoom, focus, pan, tilt, set compression format, set resolution, set frame rate, set quality, rewind, fast forward, scan, list, skip, and/or check status.

28. The one or more circuits of claim 25 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

29. The one or more circuits of claim 25 wherein the at least one media peripheral comprises one or more of a digital camera, a digital camcorder, an MP3 player, a home juke-box system, a multi-media personal digital assistant (PDA), and/or a mobile multi-media gateway device.

30. The one or more circuits of claim 25 where the user interface supports at least one media channel that comprises a user-selected sequence of media for consumption at one or both of the first home and/or the second home.

31. The one or more circuits of claim 30 wherein supporting at least one media channel comprises creation of the at least on media channel, including the display of a graphical representation of the at least one media channel on the user interface.

32. The one or more circuits of claim 25 wherein the display device comprises a television.

33. The one or more circuits of claim 25 wherein the communication terminal comprises a set top box device.

34. One or more circuits for a communication terminal supporting the indirect control of at least one media peripheral, the system comprising:

at least one processor operably connected to a display device supporting display of television content, in a first home, and communicatively coupled to control a media peripheral at a second home, the at least one processor operable to, at least:

cause display of a user interface on the display device in the first home, the user interface having at least one view comprising a representation of media available for consumption, the user interface supporting delivery of media from the first home to the second home; and communicate with software that maintains a user defined association of a first network protocol address with respect to a first user in a first home, and a second network protocol address with respect to a second user in a second home, wherein the first and second users know one another, and the software receives via a communication network a request that identifies one of the associated first and second network protocol addresses, and responds by identifying the other of the associated first and second network protocol addresses to support control from the first home, by the communication terminal, via the communication network, of the media peripheral at the second home.

35. The one or more circuits of claim 34 wherein the first and second network protocol addresses are one of an Internet protocol (IP) address, a media access control (MAC) address, or an electronic serial number (ESN).

36. The one or more circuits of claim 34 wherein the media peripheral comprises one or more of a digital camera, a digital camcorder, an MP3 player, a home juke-box system, a multi-media personal digital assistant (PDA), and/or a mobile multi-media gateway device.

37. The one or more circuits of claim 34 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

38. The one or more circuits of claim 34 wherein the communication network is the Internet.

39. The one or more circuits of claim 34 wherein the user interface, at the first home, supports identification of at least one of the second home, the media peripheral, at least one media peripheral command; and at least one media channel.

40. The one or more circuits of claim 39 where the at least one media channel comprises a user-selected sequence of media for consumption at one or both of the first home and/or the second home.

41. The one or more circuits of claim 39 wherein supporting at least one media channel comprises creation of the at least on media channel, including the display of a graphical representation of the at least one media channel on the user interface.

42. The one or more circuits of claim 34 wherein the display device comprises a television.

43. The one or more circuits of claim 34 wherein the communication terminal comprises a set top box device.

* * * * *